(12) United States Patent
Guisado (10) Patent No.: US 12,423,276 B2
(45) Date of Patent: Sep. 23, 2025

(54) AUTOMATIC PROCESSING OF SYSTEM LANDSCAPE

(71) Applicant: SAP SE, Walldorf (DE)

(72) Inventor: Victor Silva Guisado, Heidelberg (DE)

(73) Assignee: SAP SE, Walldorf (DE)

(*) Notice: Subject to any disclaimer, the term of this patent is extended or adjusted under 35 U.S.C. 154(b) by 33 days.

(21) Appl. No.: 18/506,800

(22) Filed: Nov. 10, 2023

(65) Prior Publication Data
US 2025/0156382 A1 May 15, 2025

(51) Int. Cl.
G06F 16/00 (2019.01)
G06F 16/21 (2019.01)

(52) U.S. Cl.
CPC .......... *G06F 16/214* (2019.01); *G06F 16/212* (2019.01)

(58) Field of Classification Search
None
See application file for complete search history.

(56) References Cited

U.S. PATENT DOCUMENTS

| | | | | |
|---|---|---|---|---|
| 6,075,895 A * | 6/2000 | Qiao | ..................... | A63F 13/428 |
| | | | | 382/218 |
| 6,333,999 B1 * | 12/2001 | Brownsmith | ......... | G06F 11/263 |
| | | | | 382/229 |
| 7,953,722 B2 * | 5/2011 | Tatzel | ................. | G06F 16/2455 |
| | | | | 707/706 |
| 11,023,487 B2 * | 6/2021 | Odenheimer | ........... | G06F 16/27 |
| 2002/0138656 A1 * | 9/2002 | Hickey | .................... | G06F 9/454 |
| | | | | 709/250 |
| 2003/0189599 A1 * | 10/2003 | Ben-Shachar | .......... | G09G 5/14 |
| | | | | 715/790 |
| 2004/0073571 A1 * | 4/2004 | Kumhyr | .................. | G08G 1/005 |
| 2008/0103843 A1 * | 5/2008 | Goeppert | ......... | G06Q 10/06316 |
| | | | | 705/7.41 |
| 2011/0158242 A1 * | 6/2011 | Auer | ....................... | H04L 67/06 |
| | | | | 370/400 |
| 2016/0147772 A1 * | 5/2016 | Siegmund | ............... | H04L 43/14 |
| | | | | 707/754 |
| 2019/0220538 A1 * | 7/2019 | Rese | ...................... | G06F 16/275 |
| 2021/0294571 A1 * | 9/2021 | Carson | ................ | G06F 16/3344 |
| 2023/0259520 A1 * | 8/2023 | Failer | .................... | G06F 16/254 |
| | | | | 707/602 |

* cited by examiner

*Primary Examiner* — Hasanul Mobin
(74) *Attorney, Agent, or Firm* — Mintz Levin Cohn Ferris Glovsky and Popeo, P.C.

(57) ABSTRACT

In some implementations, there is provided a method including receiving a system landscape output; processing the system landscape output using at least a rule set, wherein the processing using the rule set further comprises selecting a first output template from a plurality of output templates, selecting one or more first objects from a plurality of objects contained in the system landscape output, generating a first output using the first output template and the selected one or more first objects, selecting a second output template from the plurality of output templates, selecting one or more second objects from the plurality of objects contained in the system landscape output, and generating a second output using the first output template and the selected one or more second objects; and combining the first output and the second output to provide an aggregate output. Related systems, methods, and articles of manufacture are also disclosed.

13 Claims, 5 Drawing Sheets

AUTOMATIC PROCESSING OF SYSTEM LANDSCAPE

TECHNICAL FIELD

This disclosure relates generally to cloud computing and in particular system migrations in a cloud environment.

BACKGROUND

Database management systems have become an integral part of many computer systems. For example, some systems handle hundreds if not thousands of transactions per second (which in-turn can generate over time a large volume of corresponding data). On the other hand, some systems perform overly complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance including use of resources, such as memory and storage.

SUMMARY

In some implementations, there is provided a computer-implemented method that includes receiving a system landscape output; receiving a second indication to process the system landscape output; in response to receiving the second indication, processing the system landscape output using at least a rule set, wherein the processing using the rule set further comprises selecting a first output template from a plurality of output templates, selecting one or more first objects from a plurality of objects contained in the system landscape output, generating a first output using the first output template and the selected one or more first objects, selecting a second output template from the plurality of output templates, selecting one or more second objects from the plurality of objects contained in the system landscape output, and generating a second output using the first output template and the selected one or more second objects; and combining the first output and the second output to provide an aggregate output for an analysis of a system migration.

In some variations, one or more of the features disclosed herein including the following features can optionally be included in any feasible combination. A first indication to scan a system landscape in response to the system migration may be received. The first indication may be received from a first user interface presented at a client device. The scan of the system landscape may be triggered, such that the scan provides the system landscape output including the plurality of objects, wherein the plurality of objects include one or more schemas for one or more databases in the system landscape. The triggering may be in response to the first indication to scan being received. The plurality of objects may include a schema for a database instance being migrated as part of the system migration. The system landscape output may be stored in a cloud platform or in a persistent store. The second indication to process the system landscape output may be received from a second user interface.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some systems, a landscape of the system ("system landscape") may be used to analyze the components of the system and other data related to those components as part of, for example, a system migration. For example, the system landscape may identify applications, database instances, schemas, and other information of the analyzed system, such as support package status, database size, number of customer developments, number of modifications, transaction usage, table sizes, user roles, authorized users, and/or the like. And, an analysis of the objects may indicate whether a migration from a source system to a target system will be successful (or will result in issues and other errors). In some embodiments, there is provided a system landscape output processor (SLOP). The SLOP may be used to process an output of a system landscape generator. For example, during a migration of a system from a first host environment to a second host environment, the system landscape generator may scan the system landscape to obtain information regarding the components at the cloud service. This system landscape output is then automatically processed by the SLOP using one or more output templates and one or more rule sets to form an aggregate output for an analysis of the system migration.

Before providing additional details regarding system landscape output processor, the following provides an example of a system environment.

Figure 1:
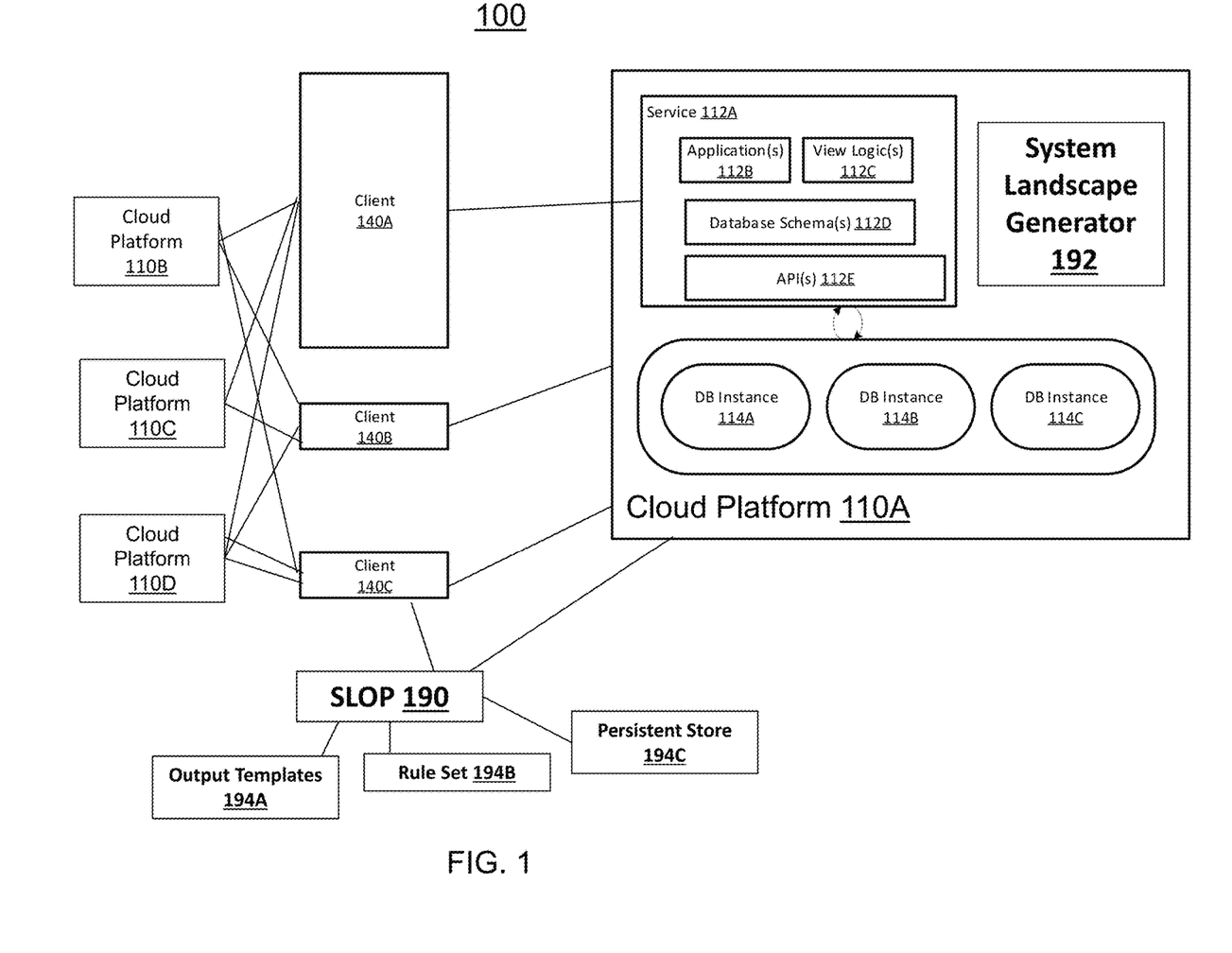
FIG. 1 depicts a diagram illustrating an example of a system including a system landscape output processor, in accordance with some embodiments.

FIG. 1 depicts a diagram illustrating an example of a system 100 consistent with some implementations of the current subject matter. Referring to FIG. 1, the system 100 may include a plurality of cloud platforms 110A-D. Each of the cloud platforms may provide resources that can be shared among a plurality of tenants. For example, the cloud platforms 110A-D may be configured to provide a variety of services including, for example, software-as-a-service (SaaS), platform-as-a-service (PaaS), infrastructure as a service (IaaS), database as a service (DaaS), and/or the like, and these services can be accessed by one or more tenants (labeled clients) of the cloud platform.

In the example of FIG. 1, the system 100 includes a system landscape output processor (SLOP), such as SLOP 190. The SLOP is used to process the output of the system landscape generator 192. For example, during a migration of a system from a first host environment, such as cloud platform 110A, to a second host environment such as cloud platform 110A, the system landscape generator 192 may scan the system landscape at the cloud platform 110A to obtain information regarding the components at the cloud service. This system landscape output is then processed by the SLOP using one or more output templates 194A and one or more rule sets 194B to form an aggregate output for an analysis of the system migration.

In some embodiments, the SLOP 190 may receive a first indication to scan a system landscape, such as the system landscape of cloud platform 110A hosting a service 112A, an applications 112B, a database (DB) instances 114A-C, and/or the like. As noted, the first indication may be received in response to a system migration from a first source system, such as cloud platform 110A, to a second target system, such as cloud platform 110B.

In response to the first indication to scan being received, the SLOP 190 may trigger a scan of the cloud platform, such as cloud platform 110A, to obtain a plurality of object, such as data, which can be used to analyze the migration. For example, the SLOP 190 may send a message to the system landscape generator 192 to scan the components of the cloud platform 110A. The scan request may request that the system landscape generator 192 provide an output, such as a system landscape output. The system landscape output may include a plurality of objects associated with the landscape at cloud platform 110A. For example, the plurality of object may include one or more schemas for one or more databases in the system landscape, operating system(s) for the one or more databases instances, identity of one or more application servers in the system landscape, identity of one or more clients in the system landscape, one or more software application installed in the system landscape, one or more client tables, one or more system tables, users authorized to access the database instances, and/or other data and/or metadata about the system landscape at cloud platform 110A.

The SLOP 190 may receive the system landscape output from the system landscape generator 192. Alternatively, or additionally, the SLOP may receive a second indication to process the system landscape output. This second indication may cause the SLOP to process the system landscape output using at least a first rule set, such as rule set 194B. For example, the rule set processing may include selecting (e.g., filtering, picking, identifying, and/or the like) one or more first objects from the plurality of objects contained in the system landscape output. Alternatively, or additionally, the rule set processing may also include logic or other operations, such as perform a frequency of occurrence count of the first object in the system landscape output. Alternatively, or additionally, the rule set processing may also include logic that generates code to perform an operation on one or more of the objects. Alternatively, or additionally, the rule set processing may also include a rule to select a first output template. The first output template along with the first object may be used to generate a first output (e.g., in a form and format defined by the first output template).

Alternatively, or additionally, the rule set processing may include selecting one or more second objects from the plurality of objects contained in the system landscape output. Alternatively, or additionally, the rule set processing may also include logic or other operations, such as perform a frequency of occurrence count of the second object in the system landscape output. Alternatively, or additionally, the rule set processing may also include logic that generates code to perform an operation on one or more of the objects. Alternatively, or additionally, the rule set processing may also include a rule to select a second output template. The second output template along with the second object may be used to generate a second output (e.g., in a form and format defined by the first output template). The SLOP 190 may then combine the first output and the second output to provide an aggregate output for an analysis of the system migration. This aggregate object may be in the form of a document or other form, for example, and may provide an indication regarding whether the migration can be performed successfully (e.g., without issues or errors).

In the example of FIG. 1, the system 100 includes a client 140A (e.g., a first client), a client 140B (a second client), and a client 140C (e.g., third client), although other quantities of client (which as noted are also referred to as tenants of a multi-tenant system) may be implemented as well on the cloud platform 110A. A user may access the client, and the client may each comprise a user device (e.g., a computer including an application such as a browser or other type of application). And, the client may each access, via the Internet and/or other type of network or communication link(s), at least one of the services at a cloud platform, such as cloud platform 110A-D. In some implementations, each of the client 140A-C represents a separate tenant at the cloud platform 110A for example, such that a tenant's data is not shared with other tenants (absent permission from a tenant). Alternatively, each of the client 140A-C may represent a single tenant at the cloud platform 110A, such that the tenants do share a portion of the tenant's data, for example.

The cloud platform 110A may include resources, such as at least one computer (e.g., a server), data storage, and a network (including network equipment) that couples the computer(s) and storage. The cloud platform may also include other resources, such as operating systems, hypervisors, and/or other resources, to virtualize physical resources (e.g., via virtual machines), provide deployment (e.g., via containers) of applications (which provide services, for example, on the cloud platform, and other resources.

In the case of a cloud platform being a so-called "public" cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the cloud platform may be a "private" cloud platform, in which case the resources of the cloud platform may be hosted on an entity's own private servers (e.g., dedicated corporate servers operated and/or owned by the entity). Alternatively, or additionally, the cloud platform may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In the example of FIG. 1, the cloud platform 110A may include a service 112A, which is provided to for example the client 140A (or one of the other clients 140B). This service 112A may be deployed via a container, which provides a package or bundle of software, libraries, configuration data to enable the cloud platform to deploy during runtime the service 112A to, for example, one or more virtual machines that provide the service at the cloud platform. In the example of FIG. 1, the service 112A is deployed during runtime, and provides at least one application such as an application 112B (which is the runtime application providing the service at 112A and served to the client 140A). To illustrate further, client 140A may access the application 112B to view data and/or query data stored in a database instance 114A, for example.

The service 112A may also provide view logic 112C. The view logic (also referred to as a view layer) links the application 112B to the data in the database instance 114A, such that a view of certain data in the database instances is generated for the application 112B. For example, the view logic may include, or access, a database schema 112D for database instance 114A in order to access at least a portion of at least one table at the database instance 114A (e.g., generate a view of a specific set of rows and/or columns of a database table or tables). In other words, the view logic 112C may include instructions (e.g., rules, definitions, code, script, and/or the like) that can define how to handle the access to the database instance and retrieve the desired data from the database instance.

The service 112A may include the database schema 112D. The database schema 112D may be a data structure that defines how data is stored in the database instance 114A. For example, the database schema may define the database objects that are stored in the database instance 114A. The view logic 112C may provide an abstraction layer between the database layer (which include the database instances 114A-C, also referred to more simply as databases) and the application layer, such as application 112B, which in this example is a multitenant application at the cloud platform 110A.

The service 112A may also include an interface 112E to the database layer, such as the database instance 114A and the like. The interface 112E may be implemented as an Open Data Protocol (OData) interface (e.g., HTTP message may be used to create a query to a resource identified via a URI), although the interface 112E may be implemented with other types of protocols including those in accordance with REST (Representational state transfer). In the example of FIG. 1, the database instance 114A may be accessed as a service at a cloud platform, which may be the same or different platform from cloud platform 110A. In the case of REST compliant interfaces, the interface 112E may provide a uniform interface that decouples a client and a server, is stateless (e.g., a request includes all information needed to process and respond to the request), is cacheable at the client side or the server side, and the like.

The database instances 114A-C may each correspond to a runtime instance of a database management system (also referred to as a database). One or more of the database instances may be implemented as an in-memory database (in which most, if not all, the data, such as transactional data, is stored in main memory). In the example of FIG. 1, the database instances are deployed as a service, such as a DaaS, at the cloud platform 110A. Although the database instances are depicted at the cloud platform 110A, one or more of the database instances may be hosted on another or separate platform (e.g., on-premise) and/or another cloud platform. Moreover, the service provided at the cloud platform may include other types of applications, such user interface applications, and the like.

The cloud platforms 110A-D may (as noted) be implemented using different technologies. As such, a system having heterogeneous cloud platforms may include for example, deployments at a SAP cloud, Microsoft Azure™, Amazon Web Services™, Google Cloud Platform™ data centers, a private data center, and/or the like. The heterogeneous cloud platform technology represents a multi-cloud system. In the case of database instances and/or their clients, some may be deployed at different private data centers (each of which may have different cloud platform technology, protocols, and the like), while some may be deployed at private data centers.

Moreover, the databases instances at the cloud platform may rely on the same or different storage or database technology. For example, a database management system instance may be an online transaction processing (OLTP) system using a relational database system. An example of an OLTP system is the SAP S/4HANA™ enterprise resource planning (ERP) system. Furthermore, the database management system instance may operate using for example the same or different storage technology, such as a row-oriented database system, a column-oriented database system, or a hybrid row-column store approach. Alternatively, or additionally, the database management system instance may be for example an online analytic processing (OLAP) system. Applications of OLAP systems include business reporting for sales, marketing, management reporting, business process management (BPM), budgeting, forecasting, financial reporting, and/or other types of analytics. An example of the OLAP system is the SAP BW/4HANA™ data warehouse solution, which can be used to for example answer multi-dimensional analytical (MDA) queries.

Although the system landscape generator 192 is depicted contained within the cloud platform 110A, the system landscape generator 192 may be hosted at other processors or cloud platforms as well. And although the SLOP 190 is depicted as separate from the cloud platform 110A, the SLOP may be hosted at a cloud platform, such as cloud platform 110A, B, and/or, the like, as well.

Figure 2:
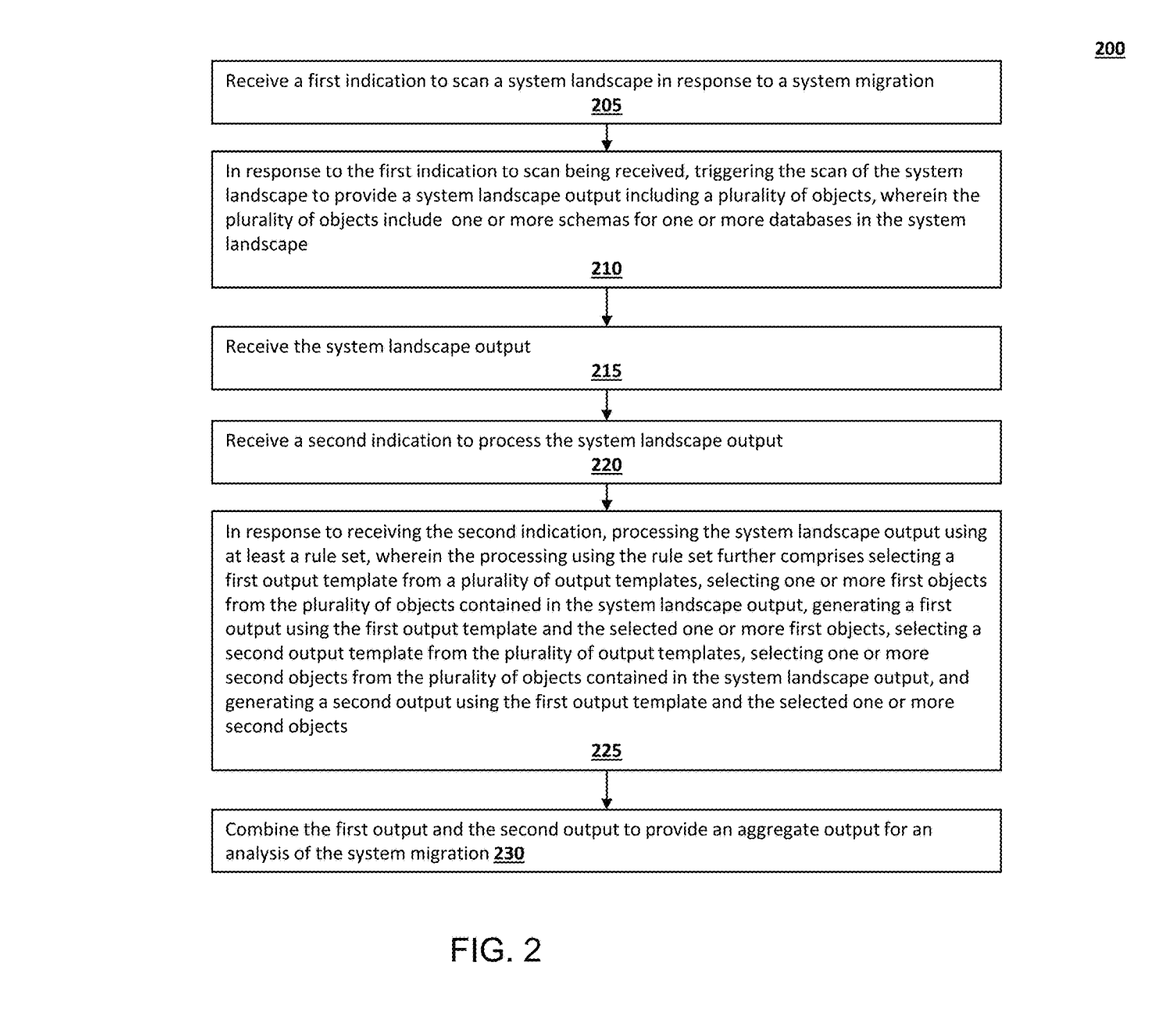
FIG. 2 depicts an example of a process for processing the system landscape output, in accordance with some embodiments.

FIG. 2 depicts a process 200 for processing system landscape output data as part of a migration, in accordance with some embodiments.

Figure 3A:
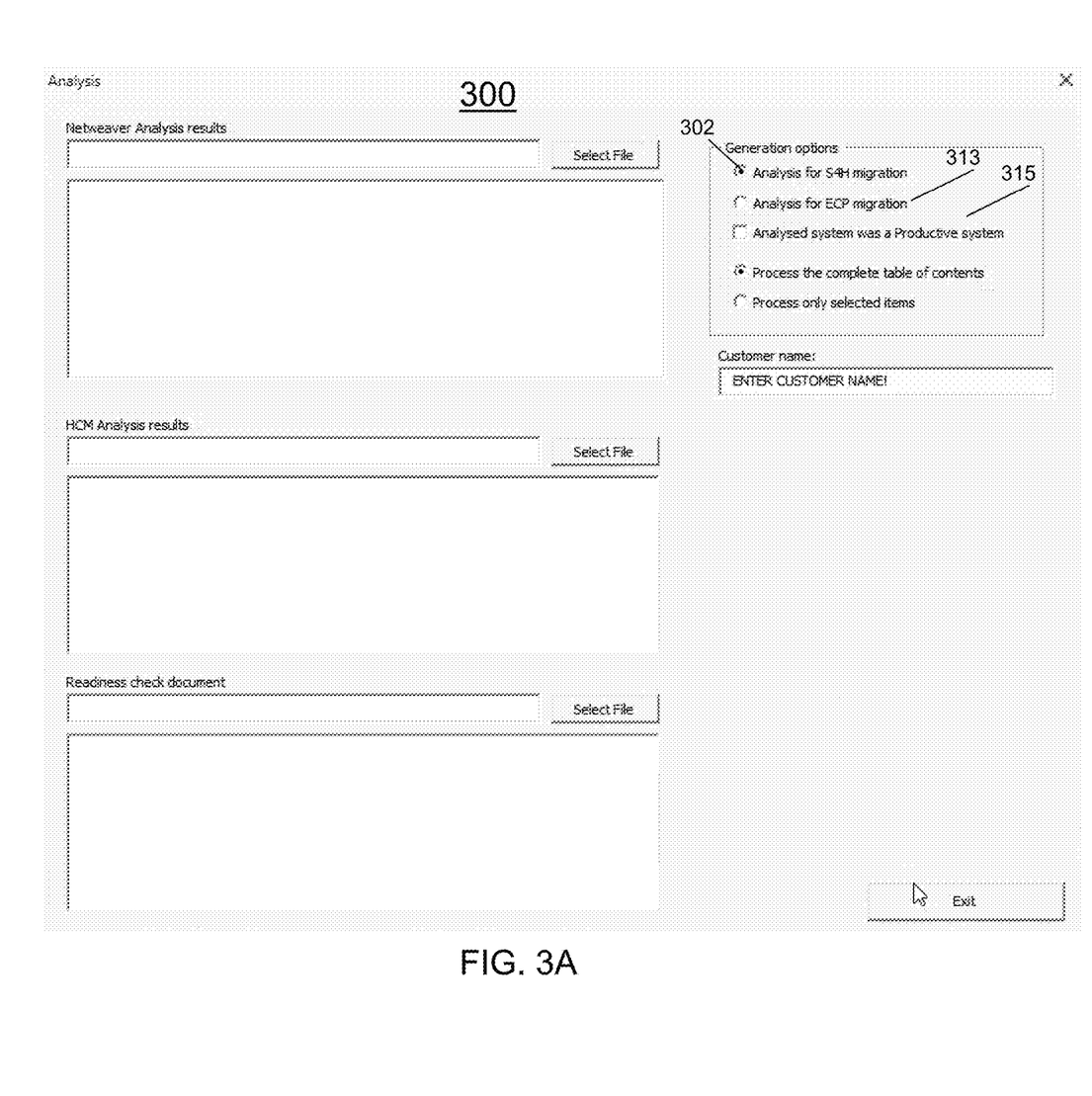
FIGS. 3A and 3B depict examples of user interfaces that may be used during the process of FIG. 2, in accordance with some embodiments.

At 205, a first indication may be received to scan a system landscape in response to a system migration, in accordance with some embodiments. For example, a user interface, such as user interface 300 at FIG. 3A, may be used to trigger a scan of a system landscape, such as the system landscape at the cloud platform 110A. In the example of FIG. 3A, the user interface 300 may be presented at a client, such as client 140A or other client device. When a selection is made of for example the graphical user interface element "Analysis for S4HANA migration" 302, this selection causes the first indication to be sent to the SLOP 190. In the example of FIG. 3A, a system migration for another system can be selected at 313. If the system selected a 302 or 313 is a production system (e.g., in use for operations by an end-user rather than a test or development system), the graphical user interface element for productive system 315 may be selected. When 315 is selected for example, the output may include only the selected items from the list in the window 306 at FIG. 3B. If 316 is selected however, all of the items in the list in window 306 will be included in the output. At FIG. 3B, there can be lists at windows 307A and 307B from other documents as well.

In response to the first indication to scan the system landscape being received at 205, the SLOP 190 may trigger, at 210, the scan of the system landscape. For example, the SLOP 190 may send a message to the system landscape generator 192 to scan the system landscape at cloud platform 110A and respond to the SLOP with a system landscape output. The system landscape output may include a plurality of objects that describe and/or characterize the cloud platform 110A as well as the components being hosted at the cloud platform. For example, the plurality of objects may include: at least one schema for at least one database instance, operating system(s) for the one or more databases instances, identity of one or more application servers in the system landscape, identity of one or more clients in the system landscape, one or more software application installed in the system landscape, one or more client tables, one or more system tables, users authorized to access the database instances, identity of customized code developments, identity of user developed or customized code, and/or other data and/or metadata about the system landscape at cloud platform 110A.

The SLOP may, at 215, receive the system landscape output from the system landscape generator 192. The SLOP may store the system landscape output in the cloud platform 110A and/or in a separate persistent store 194C.

Figure 3B:
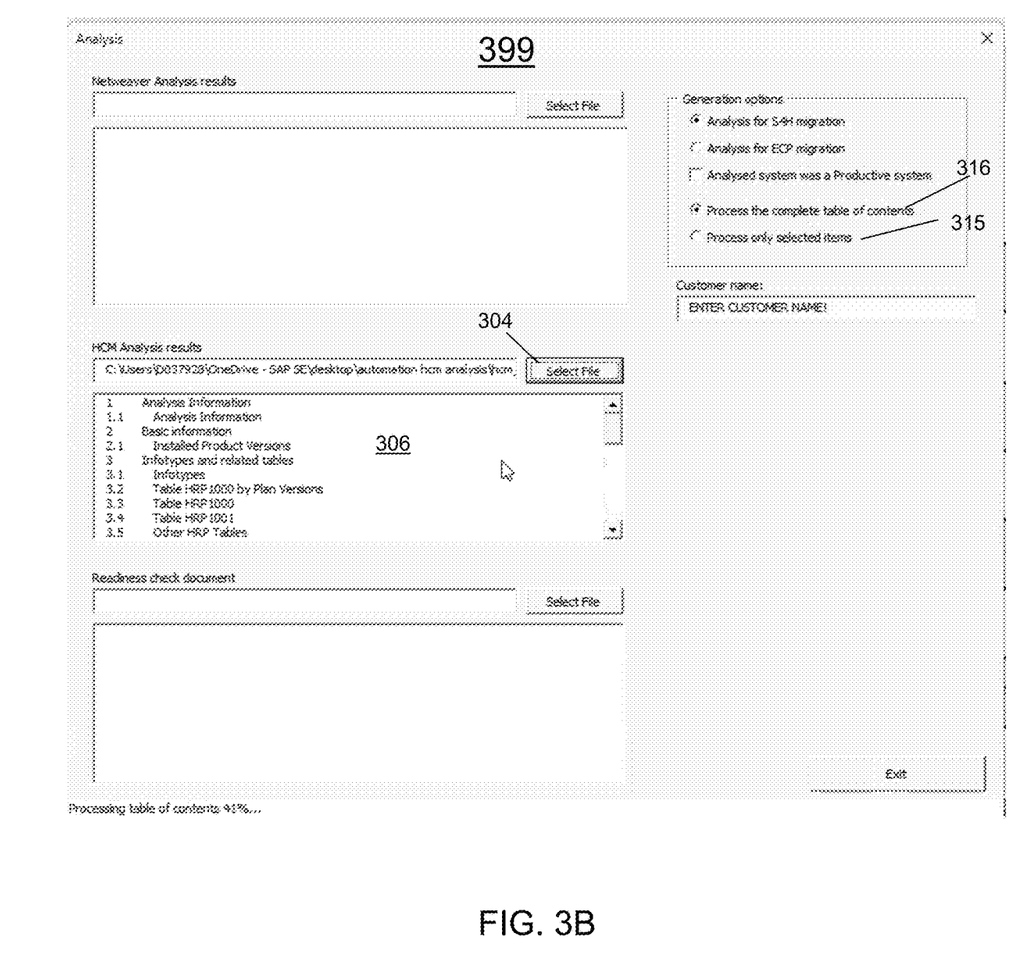

At 220, the SLOP 190 may receive a second indication to process the system landscape output, in accordance with some embodiments. For example, a user interface, such as user interface 399 at FIG. 3B, may be used to select the system landscape output. To illustrate further, the select file graphical user interface element 304 may be used to select the system landscape output (which as noted may be stored in the cloud platform 110A and/or in a separate persistent store 194C). In the example of FIG. 3B, a portion of the selected system landscape output is presented in a window 306. The window 306 shows a portion of the objects of the system landscape output. Moreover, the user interface 399 may allow selection between processing all of the plurality of objects in the system landscape output by selecting the graphical user interface element "Process the complete table of contents" 316, or selection of a portion of the plurality of objects in the system landscape output by selecting the graphical user interface element "Process only selected items" 315. The selected items may be selected via window 306, for example.

In response to receiving the second indication, the SLOP 190 may initiate at 225 processing of the system landscape output (which includes the plurality of objects). This processing may use at least a rule set, such as rule set 194B and at least one output template, such as output template 194A. For example, the rule set 194B may provide one or more rules (e.g., conditions, logics, commands, instructions, and/or the like) for selecting one or more first objects from the plurality of objects contained in the system landscape output. Referring to FIG. 3B, the rule set may define that if "Infotypes" is detected in the objects at 300, then select that "Infotype" object for further processing, such as perform a certain action defined by the ruleset. To illustrate further, the rule set processing may include logic that perform a frequency of occurrence count of the quantity of Infotypes found in the objects in the system landscape output. Alternatively, or additionally, the rule set processing may also include a rule to indicating which template to select, such as select a first output template. This first output template along with the first object may be used to generate a first output. For example, the first output template may define that the first object is to be inserted into a certain table of a document or trigger an alert message, such as an error message. The rule set processing may include rules defining the selection of other one or more second objects from the plurality of objects contained in the system landscape output. Referring to FIG. 3B at window 306, the rule set may define that if "Installed Product Versions" is detected in the objects, then select that "Installed Product Versions" object for further processing, such as perform a certain action defined by the ruleset. Alternatively, or additionally, the rule set processing may also include a rule to indicate which template to select, such as select a second output template. This second output template along with the second object may be used to generate a second output. For example, the second output template may define that the second object is to be inserted into a certain table of a document or trigger an alert message. At 230, the SLOP 190 may then combine the first output and the second output (as well as other objects processed using the rules) to provide an aggregate output for an analysis of the system migration. And, this aggregate object may be in the form of a document or in other forms as well such as an error message, for example.

In some embodiments, the rule set 194B may also define code that process the objects of the system landscape output. For example, the code may interpret the data of the object. To illustrate further, the code may interpret that if the object being processed relates to the object Employee Central Payroll, the code will search for payroll schemas in the plurality of objects, identify the payroll schemas, whether schemas are system wide schemas or customer specific schemas, and generate an error indication if certain modifications (e.g., updates needed to operate properly) to the schemas are not found in the objects. The rule set 194B (or its corresponding code) may also generate a count of other flagged warnings, and the rule set may output that count and format the count in accordance with an output template as part of the analysis of the migration.

Figure 4:
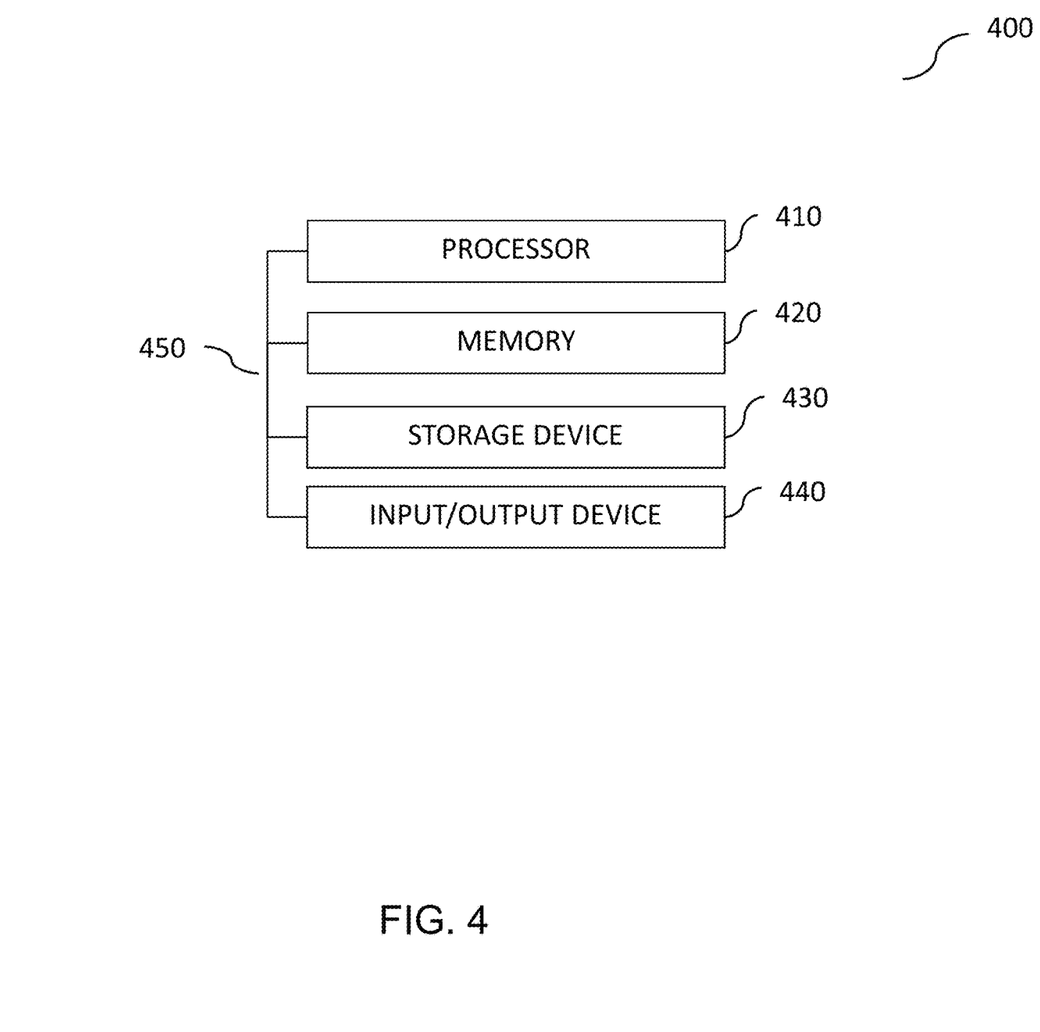
FIG. 4 depicts another example of a system, in accordance with some embodiments.

In some implementations, the current subject matter may be configured to be implemented in a system 400, as shown in FIG. 4. For example, the SLOP 190, system landscape generator 192, and/or other aspects disclosed herein may be at least in part physically comprised on system 400. To illustrate further system 400 may further an operating system, a hypervisor, and/or other resources, to provide virtualize physical resources (e.g., via virtual machines). The system 400 may include a processor 410, a memory 420, a storage device 430, and an input/output device 440. Each of the components (e.g., 410, 420, 430 and 440) may be interconnected using a system bus 450. The processor 410 may be configured to process instructions for execution within the system 400. In some implementations, the processor 410 may be a single-threaded processor. In alternate implementations, the processor 410 may be a multi-threaded processor.

The processor 410 may be further configured to process instructions stored in the memory 420 or on the storage device 430, including receiving or sending information through the input/output device 440. The memory 420 may store information within the system 400. In some implementations, the memory 420 may be a computer-readable medium. In alternate implementations, the memory 420 may be a volatile memory unit. In yet some implementations, the memory 420 may be a non-volatile memory unit. The storage device 430 may be capable of providing mass storage for the system 400. In some implementations, the storage device 430 may be a computer-readable medium. In alternate implementations, the storage device 430 may be a floppy disk device, a hard disk device, an optical disk device, a tape device, non-volatile solid state memory, or any other type of storage device. The input/output device 440 may be configured to provide input/output operations for the system 400. In some implementations, the input/output device 440 may include a keyboard and/or pointing device. In alternate implementations, the input/output device 440 may include a display unit for displaying graphical user interfaces.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising:
receiving a system landscape output;
receiving a second indication to process the system landscape output;
in response to receiving the second indication, processing the system landscape output using at least a rule set, wherein the processing using the rule set further comprises selecting a first output template from a plurality of output templates, selecting one or more first objects from a plurality of objects contained in the system landscape output, generating a first output using the first output template and the selected one or more first objects, selecting a second output template from the plurality of output templates, selecting one or more second objects from the plurality of objects contained in the system landscape output, and generating a second output using the first output template and the selected one or more second objects; and combining the first output and the second output to provide an aggregate output for an analysis of a system migration.

Example 2: The computer-implemented method of Example 1 further comprising: receiving a first indication to scan a system landscape in response to the system migration.

Example 3: The computer-implemented method of any of Examples 1-2, wherein the first indication is received from a first user interface presented at a client device.

Example 4: The computer-implemented method of any of Examples 1-3, further comprising: triggering a scan of a system landscape to provide the system landscape output including the plurality of objects, wherein the plurality of objects include one or more schemas for one or more databases in the system landscape.

Example 5: The computer-implemented method of any of Examples 1-4, wherein the triggering is in response to the first indication to scan being received.

Example 6: The computer-implemented method of any of Examples 1-5, wherein the plurality of objects include a schema for a database instance being migrated as part of the system migration.

Example 7: The computer-implemented method of any of Examples 1-6, further comprising: storing the system landscape output in a cloud platform or in a persistent store.

Example 8: The computer-implemented method of any of Examples 1-7, wherein the second indication to process the system landscape output is received from a second user interface.

Example 9: A system comprising:
at least one processor; and
at least one memory including instructions which when executed by the at least one processor causes operations comprising:
receive a system landscape output;
receiving a second indication to process the system landscape output;
in response to receiving the second indication, processing the system landscape output using at least a rule set, wherein the processing using the rule set further comprises selecting a first output template from a plurality of output templates, selecting one or more first objects from a plurality of objects contained in the system landscape output, generating a first output using the first output template and the selected one or more first objects, selecting a second output template from the plurality of output templates, selecting one or more second objects from the plurality of objects contained in the system landscape output, and generating a second output using the first output template and the selected one or more second objects; and
combining the first output and the second output to provide an aggregate output for an analysis of a system migration.

Example 10: The system of Example 10 further comprising: receiving a first indication to scan a system landscape in response to the system migration.

Example 11: The system of Examples 9-10, wherein the first indication is received from a first user interface presented at a client device.

Example 12: The system of Examples 9-11, further comprising: triggering a scan of a system landscape to provide the system landscape output including the plurality of objects, wherein the plurality of objects include one or more schemas for one or more databases in the system landscape.

Example 13: The system of Examples 9-12, wherein the triggering is in response to the first indication to scan being received.

Example 14: The system of Examples 9-13, wherein the plurality of objects include a schema for a database instance being migrated as part of the system migration.

Example 15: The system of Examples 9-14, further comprising: storing the system landscape output in a cloud platform or in a persistent store.

Example 16: The system of Examples 9-15, wherein the second indication to process the system landscape output is received from a second user interface.

Example 17: A non-transitory computer-readable storage medium including instructions which when executed by at least one processor causes operations comprising: receive a system landscape output; receiving a second indication to process the system landscape output; in response to receiving the second indication, processing the system landscape output using at least a rule set, wherein the processing using the rule set further comprises selecting a first output template from a plurality of output templates, selecting one or more first objects from a plurality of objects contained in the system landscape output, generating a first output using the first output template and the selected one or more first objects, selecting a second output template from the plurality of output templates, selecting one or more second objects from the plurality of objects contained in the system landscape output, and generating a second output using the first output template and the selected one or more second objects; and combining the first output and the second output to provide an aggregate output for an analysis of a system migration.

Example 18: The non-transitory computer-readable storage medium of Example 17 further comprising: receiving a first indication to scan a system landscape in response to the system migration.

Example 19: The non-transitory computer-readable storage medium of Examples 19-18, wherein the first indication is received from a first user interface presented at a client device.

Example 20: The non-transitory computer-readable storage medium of Examples 19-19 further comprising: triggering a scan of a system landscape to provide the system landscape output including the plurality of objects, wherein the plurality of objects include one or more schemas for one or more databases in the system landscape.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method, comprising:
receiving a first indication to scan a system landscape in response to a system migration;
in response to the first indication, triggering a scan of the system landscape to provide a system landscape output including a plurality of objects, wherein the plurality of objects include one or more schemas for one or more databases in the system landscape;
receiving the system landscape output;
receiving a second indication to process the system landscape output;
in response to receiving the second indication, processing the system landscape output using at least a rule set, wherein the processing, using at least the rule set, further comprises:
selecting a first output template from a plurality of output templates, selecting one or more first objects from the plurality of objects contained in the system landscape output, generating a first output using the first output template and the selected one or more first objects,
selecting a second output template from the plurality of output templates, selecting one or more second objects from the plurality of objects contained in the system landscape output, and generating a second output using the first second output template and the selected one or more second objects; and
combining the first output and the second output to provide an aggregate output for an analysis of the system migration.

2. The computer-implemented method of claim 1, wherein the first indication is received from a first user interface presented at a client device.

3. The computer-implemented method of claim 1, wherein the schema is at least for a database instance being migrated as part of the system migration.

4. The computer-implemented method of claim 1, further comprising:
storing the system landscape output in a cloud platform or in a persistent store.

5. The computer-implemented method of claim 1, wherein the second indication to process the system landscape output is received from a second user interface.

6. A system comprising:
at least one processor; and
at least one memory including instructions which when executed by the at least one processor causes operations comprising:
receiving a first indication to scan a system landscape in response to a system migration;
in response to the first indication, triggering a scan of the system landscape to provide a system landscape output including a plurality of objects, wherein the plurality of objects include one or more schemas for one or more databases in the system landscape;
receiving a system landscape output;
receiving a second indication to process the system landscape output;
in response to receiving the second indication, processing the system landscape output using at least a rule set, wherein the processing, using at least the rule set, further comprises:
selecting a first output template from a plurality of output templates, selecting one or more first objects from the plurality of objects contained in the system landscape output, generating a first output using the first output template and the selected one or more first objects,
selecting a second output template from the plurality of output templates, selecting one or more second objects from the plurality of objects contained in the system landscape output, and generating a second output using the second output template and the selected one or more second objects; and
combining the first output and the second output to provide an aggregate output for an analysis of the system migration.

7. The system of claim 6, wherein the first indication is received from a first user interface presented at a client device.

8. The system of claim 6, wherein the schema is at least for a database instance being migrated as part of the system migration.

9. The system of claim 6, further comprising:
storing the system landscape output in a cloud platform or in a persistent store.

10. The system of claim 6, wherein the second indication to process the system landscape output is received from a second user interface.

11. A non-transitory computer-readable storage medium including instructions which when executed by at least one processor causes operations comprising:
receiving a first indication to scan a system landscape in response to a system migration;
in response to the first indication, triggering a scan of the system landscape to provide a system landscape output including a plurality of objects, wherein the plurality of objects include one or more schemas for one or more databases in the system landscape;
receiving a system landscape output;
receiving a second indication to process the system landscape output;
in response to receiving the second indication, processing the system landscape output using at least a rule set, wherein the processing, using at least the rule set, further comprises:
selecting a first output template from a plurality of output templates, selecting one or more first objects from the plurality of objects contained in the system landscape output, generating a first output using the first output template and the selected one or more first objects,
selecting a second output template from the plurality of output templates, selecting one or more second objects from the plurality of objects contained in the system landscape output, and generating a second output using the second output template and the selected one or more second objects; and
combining the first output and the second output to provide an aggregate output for an analysis of the system migration.

12. The non-transitory computer-readable storage medium of claim 11, wherein the first indication is received from a first user interface presented at a client device.

13. The computer-implemented method of claim 1, wherein the first output template and/or the second output template first indicate at least that an object is to be inserted into a table of a document.

\* \* \* \* \*